United States Patent
Kim

(10) Patent No.: US 7,920,510 B2
(45) Date of Patent: Apr. 5, 2011

(54) MINIMIZED IP CONNECTIVITY ESTABLISHMENT PROCEDURES

(75) Inventor: Yong-Ho Kim, Anyang (KR)

(73) Assignee: LG Electronics Inc., Seoul (KR)

( * ) Notice: Subject to any disclaimer, the term of this patent is extended or adjusted under 35 U.S.C. 154(b) by 1018 days.

(21) Appl. No.: 11/125,479

(22) Filed: May 9, 2005

(65) Prior Publication Data

US 2005/0272481 A1 Dec. 8, 2005

Related U.S. Application Data

(60) Provisional application No. 60/569,238, filed on May 10, 2004, provisional application No. 60/570,836, filed on May 14, 2004, provisional application No. 60/571,537, filed on May 17, 2004, provisional application No. 60/577,186, filed on Jun. 7, 2004.

(30) Foreign Application Priority Data

Jun. 8, 2004 (KR) .................. 10-2004-0041597
May 6, 2005 (KR) .................. 10-2005-0038142

(51) Int. Cl.
*H04W 4/00* (2009.01)
*G06F 15/177* (2006.01)
*G06F 15/173* (2006.01)

(52) U.S. Cl. ........ 370/328; 370/329; 370/331; 370/338; 709/221; 709/226

(58) Field of Classification Search ............... 455/435.1, 455/436; 370/254; 709/221, 226
See application file for complete search history.

(56) References Cited

U.S. PATENT DOCUMENTS

| | | | |
|---|---|---|---|
| 6,144,653 A | 11/2000 | Persson et al. | |
| 6,385,451 B1 | 5/2002 | Kalliokulju et al. | |
| 6,590,880 B1 | 7/2003 | Maenpaaet et al. | |
| 6,665,713 B1 * | 12/2003 | Hada et al. ................. | 709/220 |
| 6,704,789 B1 | 3/2004 | Ala-Laurila et al. | |
| 6,735,202 B1 | 5/2004 | Ahmed et al. | |

(Continued)

FOREIGN PATENT DOCUMENTS

CA 2395638 5/2002

(Continued)

OTHER PUBLICATIONS

IEEE "Part 16: Air Interface for Fixed and Mobile Broadband Wireless Access Systems—Amendment for Physical and Medium Access Control Layers for Combined Fixed and Mobile Operation in Licensed Bands", IEEE 802. 16e-03/07r5, IEEE 802.16 TGe working Document, Dec. 9, 2003.

(Continued)

*Primary Examiner* — Kamran Afshar
*Assistant Examiner* — Kathy Wang-Hurst
(74) *Attorney, Agent, or Firm* — Lee, Hong, Degerman, Kang & Waimey

(57) ABSTRACT

For a broadband wireless access system, a method of configuring an IP address for a fixed/mobile station that changes from idle mode to receiving mode or when performing handover such that IP address configuration procedures are simplified. The base station determines whether the mobile station that changes from idle mode to receiving mode or performs handover needs to re-configure its IP address, and informs this to the mobile station, which can then selectively configure its IP address according to the needs of configuring its IP address.

3 Claims, 11 Drawing Sheets

U.S. PATENT DOCUMENTS

| | | | |
|---|---|---|---|
| 6,766,168 B1 | 7/2004 | Lim | |
| 6,982,967 B1 | 1/2006 | Leung | |
| 7,006,472 B1 | 2/2006 | Immonen et al. | |
| 7,213,057 B2 * | 5/2007 | Trethewey et al. | 709/218 |
| 7,218,634 B1 | 5/2007 | Khalil et al. | |
| 7,675,938 B2 | 3/2010 | Kolze | |
| 2001/0024443 A1 | 9/2001 | Alriksson et al. | |
| 2002/0062388 A1 | 5/2002 | Ogier et al. | |
| 2002/0098840 A1 | 7/2002 | Hanson et al. | |
| 2002/0114293 A1 | 8/2002 | Madour et al. | |
| 2002/0118656 A1 | 8/2002 | Agrawal et al. | |
| 2002/0141361 A1 | 10/2002 | Madour et al. | |
| 2003/0076808 A1 * | 4/2003 | McNiff et al. | 370/345 |
| 2003/0142642 A1 | 7/2003 | Agrawal et al. | |
| 2003/0185236 A1 | 10/2003 | Asano et al. | |
| 2004/0002333 A1 | 1/2004 | Neufeld | |
| 2004/0013111 A1 * | 1/2004 | Faccin | 370/378 |
| 2004/0068571 A1 * | 4/2004 | Ahmavaara | 709/228 |
| 2004/0082312 A1 * | 4/2004 | O'Neill et al. | 455/405 |
| 2004/0085957 A1 | 5/2004 | Verma | |
| 2004/0122976 A1 * | 6/2004 | Dutta et al. | 709/245 |
| 2004/0157607 A1 * | 8/2004 | Kim et al. | 455/435.2 |
| 2004/0179532 A1 | 9/2004 | Thubert et al. | |
| 2004/0203596 A1 * | 10/2004 | Sreemanthula et al. | 455/411 |
| 2004/0203765 A1 * | 10/2004 | Das et al. | 455/435.1 |
| 2004/0218556 A1 | 11/2004 | Son et al. | |
| 2004/0235536 A1 | 11/2004 | Kim et al. | |
| 2004/0266436 A1 * | 12/2004 | Jaakkola et al. | 455/436 |
| 2005/0025164 A1 * | 2/2005 | Kavanagh et al. | 370/401 |
| 2005/0027834 A1 | 2/2005 | Chen et al. | |
| 2005/0130660 A1 | 6/2005 | Park et al. | |
| 2005/0165953 A1 | 7/2005 | Oba et al. | |
| 2005/0213539 A1 | 9/2005 | Dutta et al. | |

FOREIGN PATENT DOCUMENTS

| | | |
|---|---|---|
| CA | 002395638 A1 | 5/2002 |
| CA | 2397966 | 5/2002 |
| CN | 1413034 | 4/2003 |
| CN | 1424859 | 6/2003 |
| JP | 07-058771 | 3/1995 |
| JP | 09331580 | 12/1997 |
| JP | 11-103320 | 4/1999 |
| JP | 2002-186010 A | 6/2002 |
| JP | 2002344479 | 11/2002 |
| JP | 2003274438 | 9/2003 |
| JP | 2004-112148 | 4/2004 |
| JP | 2004-120171 A | 4/2004 |
| KR | 20000056076 | 9/2000 |
| WO | 00/608113 | 10/2000 |
| WO | 2004/021728 A2 | 3/2004 |

OTHER PUBLICATIONS

Kitroser, I. et al. "IEE802.16e Sleep Mode", IEEE C802.16e-03/15, IEEE 802.16 Broadband Wireless Access Working Group, Mar. 6, 2003.

Kim, Y. et al. "Management of Sleep Windows Size during Handover", IEEE C802.16E-04/75, IEEE 802.16 Broadband Wireless Access Working Group, May 10, 2004.

Son, Y.M., "Sleep Mode Operation During Handoff," IEEE 802.16 Broadband Wireless Access Working Group, IEEE 802.16e03/49, Sep. 4, 2003.

* cited by examiner

FIG. 1

| Name | Type | Length | Value | Scope |
|---|---|---|---|---|
| IP Address Allocation | 5.23 | 1 | Bit #0: DHP-default<br>Bit #1: Mobile IPv4<br>Bit #2: IP re-establishment required<br>Bit #3-7: reserved; shall be set to zero | REG_REQ<br>REG_RSP |
| NetID | XX | 1 | Network Prefix ID change | REG_REQ<br>REG_RSP |

FIG. 2

| Name | Type | Length | Value |
|---|---|---|---|
| IP Re-establishment required | XX | 1 | Bit #0: IP re-establishment required<br>Bit #1-7: reserved; shall be set to zero |
| NetID | XX | 1 | Network Prefix ID change |

FIG. 7

| Field | Size | Contents |
|---|---|---|
| Global Header | 152 bits | |
| For (j=0;<Num Records; j++) { | | |
| MSS unique identifier | 48 bits | Unique identifier used by MSS |
| BW Estimated | 8 bits | Bandwidth provided by BS |
| QoS Estimated | 8 bits | Service level Quality<br>- Unsolicited Grant Service (UGS)<br>- Real-time Polling Service (rtPS)<br>- Non-real-time Polling Service (nrtPS)<br>- Best Effort Service (BE) |
| } | | |
| NetID | 8 bits | MSS's subnet ID or Foreign Agent ID |
| Security Field | TBD | A means to authenticate this message |

| Frame | dst=08:00:20:23:62:77<br>src=08:00:20:A3:99:4C |
|---|---|
| IP | dst=192.170.11.250<br>src=192.170.11.254 |
| UDP | dst=67<br>src=68 |
| DHCP | chaddr=08:00:20:1F:C2:44<br>ciaddr=0.0.0.0<br>giaddr=192.170.12.254<br>yiaddr=0.0.0.0 |

| Frame | dst=08:00:20:A3:99:4<br>src=08:00:20:23:62:77 |
|---|---|
| IP | dst=192.170.11.254<br>src=192.170.11.250 |
| UDP | dst=68<br>src=67 |
| DHCP | chaddr=08:00:20:1F:C2:44<br>ciaddr=0.0.0.0<br>giaddr=192.170.12.254<br>yiaddr=192.170.12.25<br>Server identifier=192.170.11.250 |

MINIMIZED IP CONNECTIVITY ESTABLISHMENT PROCEDURES

CROSS REFERENCE TO RELATED APPLICATIONS

The present application claims the benefit of Korean patent application number 10-2004-041597 filed Jun. 8, 2004 and Korean patent application number 10-2005-038142 filed May 6, 2005, the disclosure of which is incorporated herein by reference, and the benefit of U.S. provisional application No. 60/569,238 filed May 10, 2004, U.S. provisional application No. 60/570,836 filed May 14, 2004, U.S. provisional application No. 60/571,537 filed May 17, 2004, and U.S. provisional application No. 60/577,186 filed Jun. 7, 2004, the disclosures of which are incorporated herein by reference.

BACKGROUND ART

The present invention relates to broadband (wideband) wireless (radio) access systems, in particular, to a method of simplifying the IP address configuration (establishment) procedures when a mobile/fixed terminal in idle mode changes to receiving mode or when performing handover.

In general, in a broadband wireless access system, an idle mode for a mobile (or fixed) terminal (e.g., mobile station, mobile subscriber station (MSS), user terminal, user equipment (UE), etc.) is supported in order to minimize power consumption. In idle mode, a 'paging zone' is defined as the entire region that is handled by a plurality of bases station called a 'paging group' and all base station included within the same paging zone have the same paging cycle value (Paging_Cycle) and paging offset value (Paging_Offset).

The terminal may request to the base station for changing into idle mode, and the base station delivers its paging zone identification (Paging-group ID) and the paging cycle and paging offset associated thereto to the terminal to allow that terminal to change into idle mode state. During the idle mode, the terminal can determine whether to maintain or end its idle mode based upon the paging that is delivered in broadcast format from the base station at each paging period.

Additionally, when there is traffic (e.g., data, packets, etc.) that needs to be delivered by the terminal in idle mode, the terminal may end its idle mode at any time. Also, when a terminal in idle mode does not receive paging within a set period of time due to reasons such as moving into another paging zone, losing synchronization, etc., then the terminal ends its idle mode.

When data traffic to be delivered to the terminal in idle mode is generated, the base station can make the terminal end its idle mode through paging. In such situations when traffic to be forwarded is generated for the terminal, the base station delivers an action code to enter network.

In this situation or when the terminal has data to be sent on the uplink, the terminal performs IP address configuration (establishment) procedures. If the network prefix used by the base station that received the paging did not change and remains the same, the above procedures could be omitted, but such omission is not possible because a procedure for performing network prefix comparison is not provided by the related art.

The idle mode can be comprised of the following operations and steps.
  start idle mode by mobile terminal
  cell selection
  synchronization of paging message broadcast time of terminal
  terminal paging unavailable cycle
  terminal paging listening period
  base station paging broadcast message transmission period
  base station broadcast message
  end paging available mode Among these, the technique related to the present invention is the base station paging broadcast message.

The base station paging broadcast message is a message sent via the base station or a different network element for informing a particular mobile terminal that currently delayed downlink traffic exists. This paging broadcast message must be transmitted through a broadcast connection identifier (CID) during a base station paging broadcast message transmission time period, and should be transmitted during the transmission time period regardless of the number of mobile terminals that require paging.

The base station paging broadcast message should be able to include one or more paging group IDs that indicate the logical classification of the base station that transmits. Regarding the base station paging broadcast message, the mobile terminals are distinguished by the mobile terminal MAC address hash, and a single base station paging broadcast message can include a plurality of MAC addresses.

The base station paging broadcast message must transmit an action code with respect to each mobile terminal that is distinguished by mobile terminal MAC address hashes, and such action codes are as follows.
  00: no action required
  01: perform Ranging to configure location and acknowledge message
  10: perform initial network entry
  11: reserved Among the above action codes, the base station paging broadcast message that is transmitted when there is downlink data, transmits an action code '10' and the terminal performs network entry procedures based upon this action code.

Accordingly, in the related art, the mobile terminal must always re-configure (re-establish) its IP address when the mobile terminal in idle mode receives paging from the base station because there is downlink data to be received or when there is uplink data to be sent.

Namely, when a mobile terminal operating in idle mode moves into a different base station region and receives from the base station a paging broadcast message indicating that currently set aside (delayed) downlink data exists, the mobile terminal may omit the IP address configuration (establishment) procedures if the IP Subnet, Prefix, and Access Router (NetID) used by the base station are the same as those previously used by the mobile terminal. Also, when the mobile terminal in idle mode performs registration procedures with the base station because it has data to be sent on the uplink, the base station compares the previously received IP Subnet, Prefix, and Access Router (NetID) used by the mobile terminal with the IP Subnet, Prefix, and Access Router (NetID) that are can be used or are currently being used within the base station, and informs to the mobile station as to whether IP address re-configuration (re-establishment) is needed or not.

However, because the related art does not provide the procedures that can compare the IP Subnet, Prefix, and Access Router (NetID), the mobile terminal had to perform IP address configuration (establishment) procedures each time the idle mode was ended when there was uplink or downlink data, thus causing the problems of unnecessary time delays.

Meanwhile, the process for handover in a broadband wireless access system comprises a pre-processing procedure, a handover procedure, and a 'drops and corrupted HO attempts' procedure.

1. Pre-Processing Procedures for Handover

As the pre-processing procedures for handover of IEEE 802.16e, a procedure of informing the mobile terminals by broadcasting from a base station, the information related to neighboring base stations (e.g., Network Topology Advertisement), a procedure of measuring the channel quality of neighboring base stations based upon such information (e.g., MSS scanning of neighbor BS), and a procedure of selectively matching time differences and the like for the neighboring base station and initial terminal power value, as well as for synchronization (e.g., association procedures).

* Network Topology Advertisement

The base station informs all mobile stations within a cell about the information of neighboring base stations by transmitting information related to network constitution information in a broadcasting manner through a MOB_NBR-ADV MAC (Medium Access Control) message.

* MSS Scanning of Neighbor BS

As a mobile terminal must scan (search) neighboring base stations for handover, a scanning interval is requested to the base station through a MOB_SCN-REQ MAC message for scanning neighbor base stations, and the base station transmits a MOB_SCN-RSP MAC message in response to allocate an interval that allows the terminal to scan neighboring base stations. Also, the base station may directly transmit a MOB_SCN_RSP MAC message without any request of the mobile terminal (i.e., unsolicited request). At this time, the scanning interval and offset unit to start scanning that the base station allocates are all allocated in units of frames.

* Association Procedure

The association procedure is a procedure in which the terminal normally joins a cell by performing a ranging procedure with the base station. The associate procedure is performed when the terminal scans the base stations and selects a new base station. A RNG-REQ MAC message is transmitted by the terminal, and the base station transmits a RNG-RSP MAC message to set the power offset value, timing offset value, etc. to the appropriate values.

Transmitting of the RNG-REQ MAC message is referred to as an initial ranging operation, and is one of the most basic operations of an IEEE 802.16 system by which the terminal performs a network entry process. The target base station that receives a new terminal through handover (HO), transmits the matters in association to the cell of the terminal to the serving base station that the terminal was previously a part of, and then stores the information related to the terminal.

2. Handover (HO) Process

Based upon the neighboring base station and channel quality information obtained from the above handover pre-processing procedures, the terminal begins handover.

* Cell Selection

The cell selection operation is an operation of changing a cell in order to newly register with a base station that allows reception of a signal having a better Signal-to-Interference-Noise Ratio (SINR) than the SINR of the signal transmitted from the base station of a current cell before the terminal normally registers with the cell. At this time, the base station has no way of knowing about any movement of the terminal because the terminal has not yet performed any registration procedures.

* HO Initiation

Handover initiation can be performed by either the base station (BS) or the mobile terminal (MSS: mobile subscriber station). Namely, when the base station requests handover, it transmits a MOB_BSHO-REQ MAC message, and when the mobile terminal requests handover, it transmits a MOB_MSSHO-REQ MAC message. If the terminal transmits a MOB_MSSHO-REQ MAC message, the SINR of the signals received from neighboring base stations is transmitted to the base station, and the candidate base stations that can be a target base station during handover are transmitted to the currently serving base station.

The base station receives a MOB_MSSHO-REQ MAC message from the terminal or before the base station itself transmits a MOB_MSSHO-REQ MAC message in order to handover the terminal, the handover of the terminal is allowed after checking the responses (ACK) from neighboring base stations for performing handover of the particular terminal. The terminal or base station that receives the MOB_BSHO/MSSHO-REQ message transmits a MOB_MSSHO/BSHO-RSP MAC message to inform about the target base station that will perform the handover.

* HO Cancellation

After the MOB_MSSHO/BSHO-REQ MAC message is transmitted to allow the terminal or base station to perform handover, the terminal may cancel the handover. Here, the terminal can set a particular field of the MOB_HO-IND MAC message (e.g., HO_Type=01) and transmit such to the base station for canceling the handover that is currently being performed.

* Termination with the Serving BS

By transmitting a MOB_HO-IND MAC message to the serving base station, the terminal informs that handover has been properly completed and finishes the handover operation. Here, the terminal can set a particular field of the MOB_HO-IND MAC message (e.g., HO_Type=00) and transmit such to the serving base station to inform that handover has been properly completed. Upon receiving the MOB_HO-IND MAC message from the terminal, the base station terminates the MAC state machine, ARQ connection, and all connections related to data transmission that were allocated the terminal that has been handed over.

* HO Rejection

The terminal may reject the handover recommended by the base station, and does so by setting a particular field of the MOB_HO-IND MAC message (e.g., HO_Type=10) and transmits to the base station. Upon receiving a rejection message from the terminal, the base station re-constitutes the target base stations and re-transmits a MOB_BSHO-RSP message to the terminal.

3. Drops and Corrupted HO Attempts

If the downlink data received from the base station cannot be reconstructed (recovered, decoded, etc.) or if a RNG-RSP MAC message (with respect to a RNG-REQ MAC message) transmitted to the base station after handover is not properly received and the limit on the number of times that the RNG-REQ MAC message can be transmitted to the base station is reached, the terminal terminates communication. In such case, the terminal re-performs the network entry procedures with the desired target base station to perform an operation for connection recovery.

* Re-Entry with the Target BS

The terminal that performed handover performs a new network entry operation with the target base station, and also performs handover procedures for re-entry with neighboring base stations as well. However, from the point of view of the base station, the re-entry is performed in the same manner as a regular network entry procedure.

* Synchronization with Downlink and Obtain Parameters

The terminal that performed handover detects the downlink signal of the target base station to form synchronization with the base station, and receives a MOB_NBR-ADV MAC message transmitted by the base station to determine the conditions of neighboring base stations. Also, the terminal performs the same procedures as in a regular network entry procedure, namely, the operations to receive the DL_MAP and DCD message are performed.

* Obtain Uplink Parameters

The terminal that performed handover, after obtaining the downlink parameters as described above, receives uplink parameters through reception of a UL_MAP MAC message, a UCD message, etc.

* Ranging and Uplink Parameters Adjustment

The terminal that performed handover attempts to perform ranging with the new base station. This ranging operation is one of the most basic operations in a IEEE 802.16 system, whereby a ranging operation of a competitive allocation method is performed through a ranging opportunity (i.e., an interval allowing transmission of a ranging message) that is allocated by the base station based upon the 48 bit length MAC address of the terminal itself. Through this ranging operation, the terminal receives a new basic ID and a primary management ID allocated from the target base station. This operation achieved as the terminal obtains the uplink parameters by receiving the Fast_UL_Ranging IE that is transmitted by being inserted into the UL_MAP MAC message transmitted by the base station.

Here, the ranging opportunity received for the above ranging operation is performed in a contention-free manner, unlike the initial ranging operation performed for regular network entry.

* MSS Re-Authentication

This is an authentication procedure for normal operation of the terminal, whereby an authentication procedure occurs by using a PKM (Private Key Management) protocol, while the existing security context performs the authentication procedure without any changes.

* Re-Register and Re-Establish Provisioned Connections

The base station is in a state by which the 48 bit MAC address if the terminal has already been received, and since the authentication procedure of the terminal was performed properly, the proper registration procedure of the terminal is performed. The terminal begins the registration process by transmitting a REG-REQ MAC message, and the base station transmits a REG-RSP MAC message to re-establish a provisioned connection of the terminal before handover, to allow proper IP service to be performed.

In general, IP re-configuration (re-establishment) is performed after the mobile terminal performs handover, and IP re-configuration (re-establishment) need not be performed if the IP subnet is the same. However, in the related art, this cannot be known and IP re-configuration (re-establishment) must be done each time the terminal moves. Namely, even if the previous IP address can be used without having to configure (establish) an IP address after the terminal performs handover (for example, when the IP subnet or foreign agent remain the same), IP address configuration (establishment) is always performed after the mobile terminal moves according to the related art.

PURPOSE OF THE INVENTION

The present invention provides a method of configuring (establishing) an IP address of a terminal that simplifies the IP address configuration (establishment) procedures when the terminal in idle mode changed into receiving mode or when handover is performed.

SUMMARY OF THE INVENTION

Instead of having a mobile terminal always perform IP address re-configuration whenever it is associated with a new point of attachment (e.g., performing handover, changing from idle mode to receiving mode, etc.), it is determined if IP address re-configuration is actually necessary by considering whether the previous IP address may still be used or if a new IP address needs to be configured.

BRIEF DESCRIPTION OF THE DRAWINGS

FIG. 1 depicts the format of a registration response message (REG-RSP) applied to the mobile station IP address configuration (establishment) method of the present invention.

FIG. 2 depicts the format of a ranging response message (RNG-RSP) used in the mobile station IP address configuration (establishment) method of the present invention.

FIG. 7 depicts a format of a handover check message used in the mobile station IP address configuration (establishment) method of the present invention.

DETAILED DESCRIPTION

Figure 3:
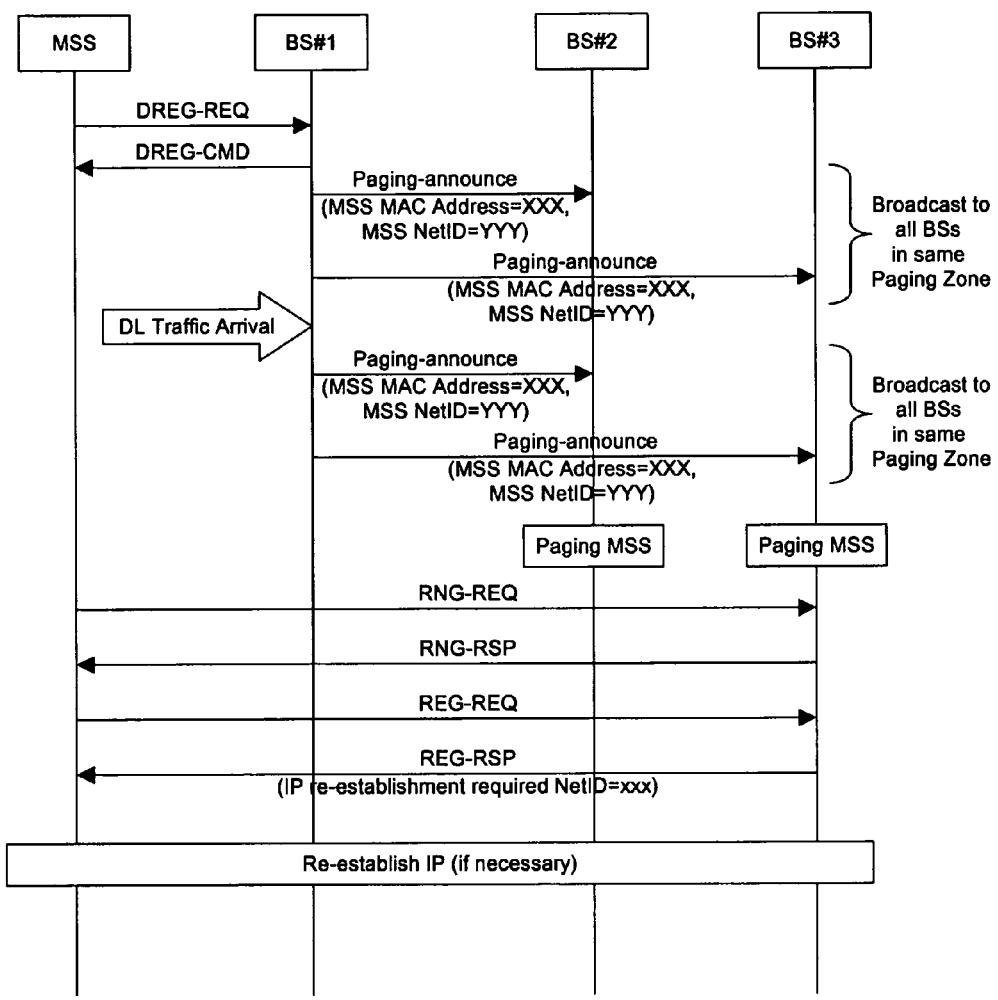
FIG. 3 depicts an example of informing whether IP address re-configuration (re-establishment) is needed, via the registration procedures when idle mode is ended because the mobile station in idle mode has downlink (DL) traffic.

The preferred exemplary embodiments of the present invention will now be explained. However, those skilled in the art would understand that the features of the present invention should not be limited to only the embodiments described herein.

The present invention is related to the research and development being conducted by various IEEE working groups, such as IEEE 802.16, and thus the concepts and teachings involved therein are applicable to the features of the present invention. Additionally, as various efforts are being made to implement the interworking of different types of networks and communication technologies, such as achieving compatibility between IEEE networks and cellular networks (such as, a third generation (3G) networks), it can be clearly understood that the present invention may also have applicability in achieving such compatibility.

Considering the communication protocols related to wireless (radio) access systems, at the network layer, to allow proper data packet communication via the Internet, an Internet Protocol (IP) provides the necessary addressing and routing information for the packets. Here, each device (e.g., user terminal, mobile handset, wireless connectivity device, etc.) connected via the Internet requires the configuration (establishment) of a unique IP address in order for that device to be properly identified and distinguished from other devices.

The Internet Protocols referred to as IP version 4 (IPv4) and IP version 6 (IPv6) have been developed. By employing 32-bit addresses, IPv4 has been found to have limitations because of the increasing popularity of Internet communications, whereby each device connected with the Internet needs its own unique IP address. As such, because the availability of 32-bit addresses would soon be exhausted, an enhancement was developed, namely, IPv6, which employs 128-bit addresses.

However, the fact that a user terminal may have mobility (e.g., mobile terminals) makes IP address configuration (establishment) more difficult. For example, to support mobility, a user terminal may undergo handover, whereby the terminal being served by one point of attachment (e.g., base station) that covers a certain region, moves to a new location and needs to be served by a different point of attachment (e.g., base station) that covers that new location. In other words, the mobile station that is part of a first subnet (i.e., a portion of the network) moves into a second subnet (i.e., another portion of the network). Another example would be when a user terminal changes its state of operation into a receiving mode from an idle mode, which is an example of a power-saving operation mode that is important because a user terminal having mobility should conserve its limited battery power.

In such handover or idle mode change situations described above, IP address configuration (establishment) must be performed at the appropriate time such that seamless data reception can be received by the user terminal.

In the related art broadband wireless access systems, regarding the handover procedures, a so-called "managed" mobile terminal performs IP address re-establishment (re-configuration) after a secondary management connection identifier (CID) is obtained upon completing handover such that IP communications can be resumed.

When a mobile terminal that moves to a new point of attachment (base station) region is managed mobile terminal, IP address re-establishment is required regardless of the subnet that can be allocated by a foreign agent or by a DHCP server connected with the new point of attachment (base station). Thus, a basis to be used for determining when IP address re-establishment should be performed is needed. In the related art, the determination at the IP layer cannot be known at the MAC layer, and thus the IP address re-establishment cannot be informed to the mobile terminal.

Thus, in the present invention, the point of attachment (base station) uses the IP address related information received via a backbone message (or another type of message), and provides a basis to allow the MAC layer to determine whether the mobile terminal should perform IP address re-establishment related procedures.

As the MAC layer of the point of attachment (base station) can inform the mobile terminal as to whether IP address establishment is necessary, the handover procedures can be simplified and the time delay in resuming communications after handover can be minimized.

One purpose of the present invention is to provide an IP address configuration (establishment) method for a terminal wherein the base station (point of attachment) determines the information related to IP address configuration (establishment) when the terminal changes from idle mode to receiving mode or when handover is performed, and informs this to the terminal.

To achieve this purpose in a broadband wireless access system, in the IP address configuration (establishment) method according to the present invention, the base station (point of attachment) determines and informs the terminal about whether the IP address of the terminal should be re-configured (re-established) when the terminal changes from idle mode to receiving mode or when handover is performed.

Preferably, the base station is a target base station to which the terminal is attempting network entry to.

Preferably, the matter of whether the IP address of the terminal should be re-configured (re-established) is delivered through a ranging response message or a registration response message.

Preferably, the base station respectively compares the IP Subnet, Prefix, and Access Router (NetID) previously used by the terminal with the IP Subnet, Prefix, and Access Router (NetID) that it may use or is currently using, in order to determine whether the IP address of the terminal should be re-configured (re-established).

Preferably, if the network prefix ID (NetID) used by the terminal changes, the base station delivers the changed NetID to the terminal through a ranging response message or a registration response message.

Preferably, the base station delivers whether the IP address should be re-configured (re-established) through a ranging response message or a registration response message only when the network prefix ID (NetID) has changed.

The present invention proposes a scheme in which the IP address establishment (configuration) procedures can be simplified according to changes (NetID) in the IP Subnet, Prefix, Access Router, and Foreign Agent being used, when the mobile/fixed terminal changes from idle mode to receiving mode or when handover is performed.

Namely, the present invention provides a method in which when the terminal receives a paging message from the base station (point of attachment) indicating that data to be transmitted on the downlink currently exists or when data to be transmitted on the uplink exists, the base station determines and informs the terminal as to whether IP address re-establishment (re-configuration) of the terminal is needed, and allowing the IP address re-configuration (re-establishment) procedures to be omitted accordingly. Also, the present invention provides a method in which after the terminal moves during the handover process, the base station determines and informs the terminal as to whether IP address re-configuration (re-establishment) of the terminal is needed, and allowing the IP address re-configuration (re-establishment) procedures to be omitted accordingly.

First, a method of configuring (establishing) an IP address of the terminal that changes from idle mode to receiving mode according to a first embodiment of the present invention will be explained.

In the terminal IP address configuration (establishment) method according to the first embodiment of the present invention, a registration response message (REG-RSP), a ranging response message (RNG-RSP), a paging broadcast backbone message, etc. are defined.

The registration response message (REG-RSP) is a message that is transmitted by setting an IP re-configuration (re-establishment) required bit, when the ID related to the terminal IP address received by the new base station (Target BS) from the previous base station (Serving BS) when the mobile terminal performs registration procedures after handover, and the ID that is currently being used (or can be used) are compared and found to be different.

The ranging response message (RNG-RSP) is a message that is transmitted by setting an IP re-configuration (re-establishment) required bit, when the ID related to the terminal IP address received by the new base station (Target BS) from the previous base station (Serving BS) when the mobile terminal performs ranging with the new base station after handover, and the ID that is currently being used (or can be used) are compared and found to be different.

Accordingly, the new base station (Target BS) informs whether the terminal IP address should be re-configured (re-established) through either the registration response message (REG-RSP) or the ranging response message (RNG-RSP).

The paging broadcast backbone message is a message used when informing the other base stations within the paging zone about the fact that data traffic to be transmitted to the mobile terminal arrived at the base station to which the mobile terminal requested registration release for changing into idle mode, or used when information about the terminals that changed into idle mode is to be commonly shared by the base stations within the same paging zone. Preferably, the paging broadcast backbone message is transmitted by including the network prefix id (NetID) that the mobile terminal had used.

FIGS. 1 and 2 respectively show examples of the formats of the registration response message (REG-RSP) and the ranging response message (RNG-RSP).

As shown in FIG. 1, the registration response message (REG RSP) indicates whether the terminal IP address should be re-configured (re-established) via bit #2. In particular, the registration response message (REG-RSP) can instruct the terminal to change its NetID, if the ID related to IP address of the terminal received by the new base station from the previous base station and the ID being currently used (or that can be used) are compared and found to be different. Preferably, even if bit #2 is not activated, if the NetID change indicator is set, then the terminal re-configures (re-establishes) its IP address.

Also, referring to FIG. 2, the ranging response message (RNG-RSP) indicates whether the terminal IP address should be re-configuration via bit #0, and the NetID change can be instructed to the terminal through a separate bit. Similarly, even if bit #0 is not activated, if the NetID change indicator is set, then the terminal re-configuration of its IP address.

FIG. 3 shows an example of how the matter of whether the IP address re-configuration should be made is informed through the registration procedures when a terminal in idle mode ends its idle mode because downlink (DL) traffic exists.

Referring to FIG. 3, the mobile terminal performs registration release request/response (DREG_REQ/DREG_RSP) with the base station in order to enter idle mode. At this time, the base station broadcasts the information about the terminal that entered idle mode to all base stations within the same paging zone (e.g., through use of a paging-announce message). Through this, the procedures that the terminal must perform should be informed to the base stations at each paging cycle. To do so, the paging broadcast backbone message may be used. The MAC address of the terminal and the Network Prefix ID (NetID) corresponding to the IP address used by the mobile terminal are both included in the paging broadcast backbone message and transmitted.

Thereafter, for a mobile terminal in idle mode, when data traffic (uplink traffic) that needs to be transmitted is generated or when data traffic (downlink traffic) that needs to be received is generated, the mobile terminal ends its idle mode and performs network entry.

The base station (BS#3), with which the mobile station performs network entry procedures, compares the network prefix ID (NetID) received from the base station (BS#1) that had its registration released by the mobile terminal and the network prefix ID (NetID) that it currently can use, and then the matter of whether IP address re-configuration (re-establishment) would be needed or not is informed to the mobile terminal during the ranging procedures (via a RNG-RSP message) or during the registration procedures (via a REG-RSP message).

Accordingly, the mobile terminal determines whether to re-configure (re-establish) its IP address based upon the RNG-RSP or REG-RSP message, and if not required, the IP address re-configuration (re-establishment) procedures may be omitted, which allows communications to be resumed more quickly.

Also, when an ID related to an IP address is changed for handover with another type of network, this can be informed by the base station to the mobile station by including such in a ranging or registration response message.

Thus, the methods that can be performed by the base station to inform the mobile station about whether IP address re-configuration (re-establishment) would be needed can be summarized as follows.

1. Method of informing by setting a configuration bit in the registration response message.

2. Method of informing by setting a configuration bit in the ranging response message.

For 1 or 2 above, if the network prefix ID (NetID) changes, this changed ID must be informed to the terminal separately by using the ranging response message and the registration response message.

3. Only in the case where the network prefix ID (NetID) changes, the mobile terminal is informed through the ranging response message or the registration response message.

Figure 4:
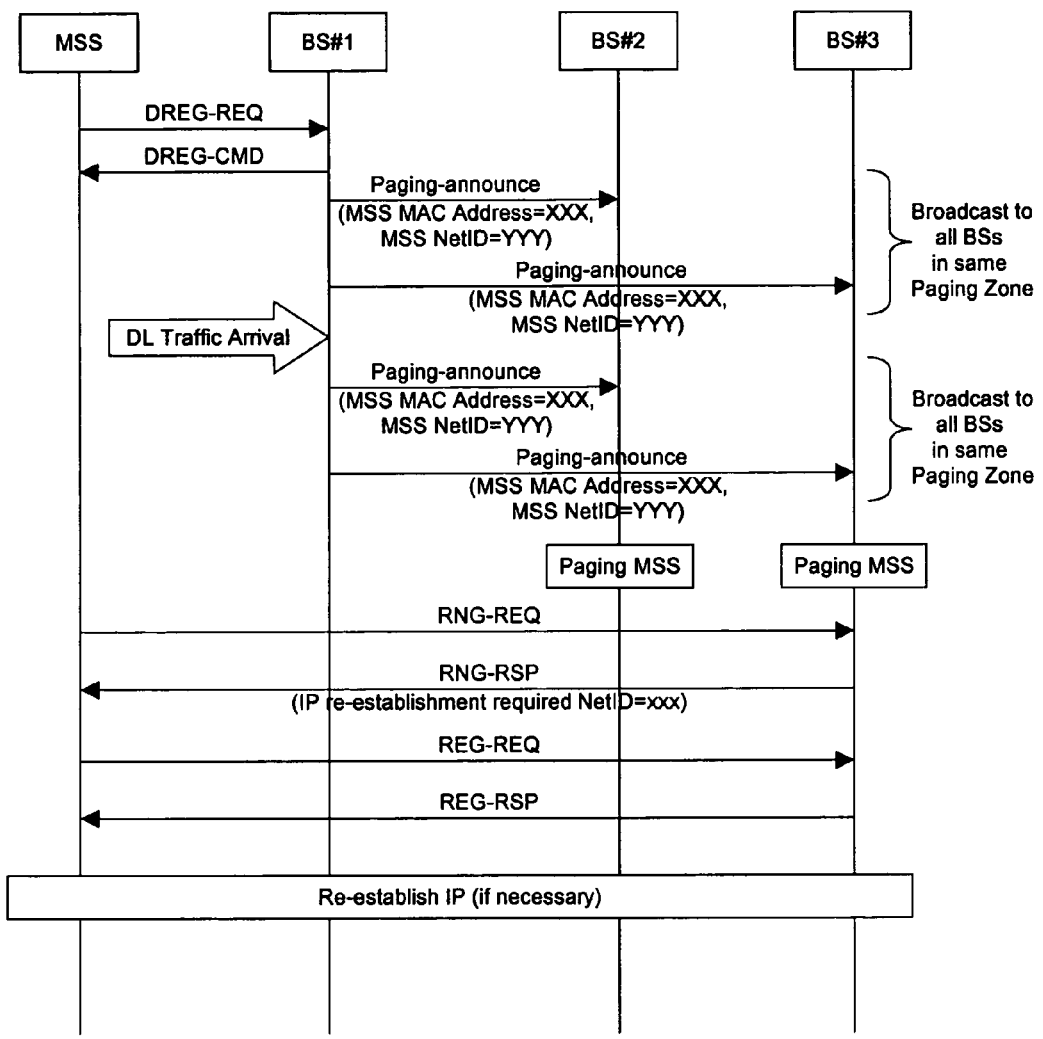
FIG. 4 depicts an example of informing whether IP address re-configuration (re-establishment) is needed, via the ranging procedures when idle mode is ended because the mobile station in idle mode has downlink (DL) traffic.

FIG. 4 shows an example of informing whether or not the IP address re-configuration (re-establishment) is needed through a ranging procedure when the terminal ends its idle mode because downlink traffic exists.

Figure 5:
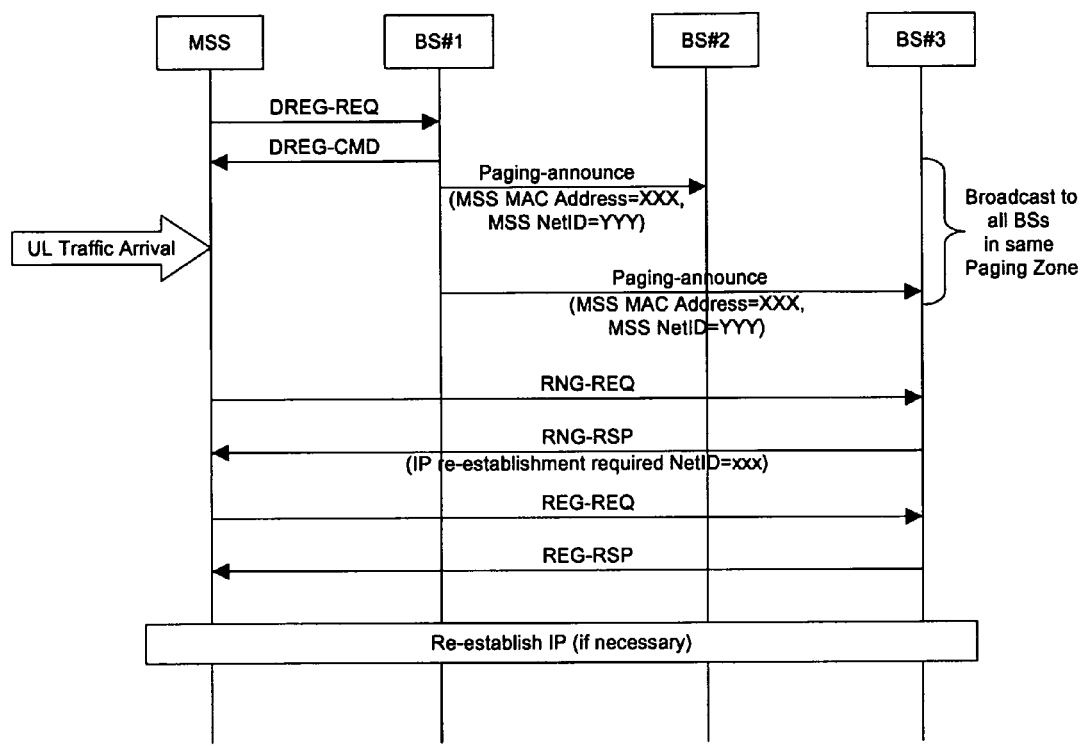
FIG. 5 depicts an example of informing whether IP address re-configuration (re-establishment) is needed, via the ranging procedures when idle mode is ended because the mobile station in idle mode has uplink (UL) traffic.

FIG. 5 also shows an example of informing whether or not the IP address re-configuration (re-establishment) is needed through a ranging procedure when the terminal ends its idle mode because downlink traffic exists.

Figure 6:
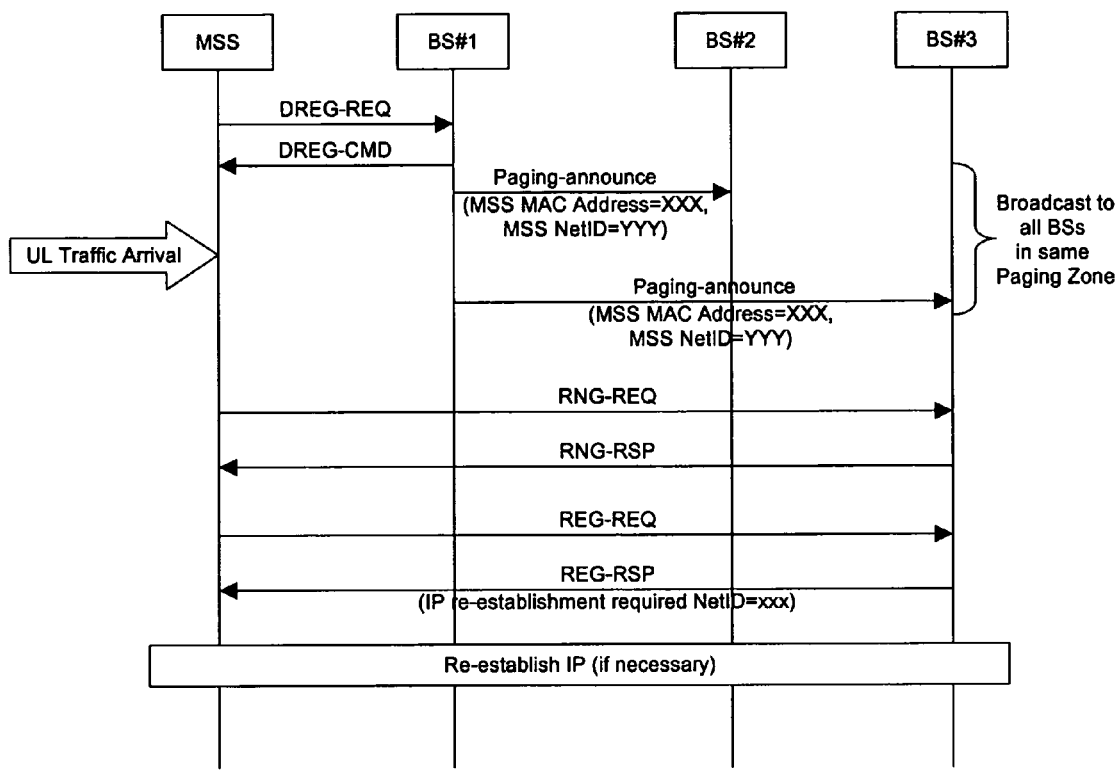
FIG. 6 depicts an example of informing whether IP address re-configuration (re-establishment) is needed, via the registration procedures when idle mode is ended because the mobile station in idle mode has uplink (UL) traffic.

FIG. 6 shows an example of informing whether or not the IP address re-configuration (re-establishment) is needed through a registration procedure when the terminal ends its idle mode because uplink traffic exists.

Hereafter, a method of configuring (establishing) an IP address of the terminal during handover according to a second embodiment of the present invention will be explained.

In the terminal IP address configuration (establishment) method according to the second embodiment of the present invention, a registration response message (REG-RSP), a ranging response message (RNG-RSP), a handover confirmation message (HO-confirm), etc. are defined.

The registration response message (REG-RSP) is a message that is transmitted by setting an IP re-configuration (re-establishment) required bit, when the ID related to the terminal IP address received by the new base station (Target BS) from the previous base station (Serving BS) when the mobile terminal performs registration procedures after handover, and the ID that is currently being used (or can be used) are compared and found to be different.

The ranging response message (RNG-RSP) is a message that is transmitted by setting an IP re-configuration (re-establishment) required bit, when the ID related to the terminal IP address received by the new base station (Target BS) from the previous base station (Serving BS) when the mobile terminal performs ranging with the new base station after handover, and the ID that is currently being used (or can be used) are compared and found to be different.

Also, the handover confirmation message is a message that allows delivery through the backbone of an IP address related message of the mobile terminal that will move from a previous base station to a new base station when the mobile terminal performs handover. Accordingly, the new base station (Target BS) can determine whether the IP address of the mobile terminal should be re-configured (re-established) through the above-described messages.

The formats of the registration response message (REG-RSP) and the ranging response message (RNG-RSP) are shown in FIGS. 1 and 2, respectively, while the format of the handover confirmation message is shown in FIG. 7.

In general, there are two types of handover; a handover started by the mobile terminal and a handover determined by the network. In either case, when handover is performed, a handover confirmation message (HO-confirm) is delivered over the backbone from the previous base station (Serving BS) to a new base station (Target BS). When the handover confirmation message (HO-confirm) having the IP address of the terminal that is moving and its related ID (NetID=xxx) is delivered, the new base station uses this for comparison with the IP address related ID (NetID) that is uses and can inform the comparison result to the terminal after handover is completed when the ranging or registration procedure is performed.

Thus, based upon the above results, the terminal can know whether the IP address should be re-configured (re-established) or whether the previously used IP address can be used. By employing the method of the present invention, the need for the terminal to re-configure (re-establish) its IP address during handover can be reduced for situations such as when the previous base station and the new base station have the same IP subnet, when the foreign agent (FA) is the same, etc., to thus minimize the delays caused each time the IP address is configured (established).

Accordingly, in the terminal IP address configuration method according to the second embodiment of the present invention, there are three methods by which the base station can inform the mobile terminal about whether the IP address should be re-configured (re-established), which are the same as those of the first embodiment.

Figure 8:
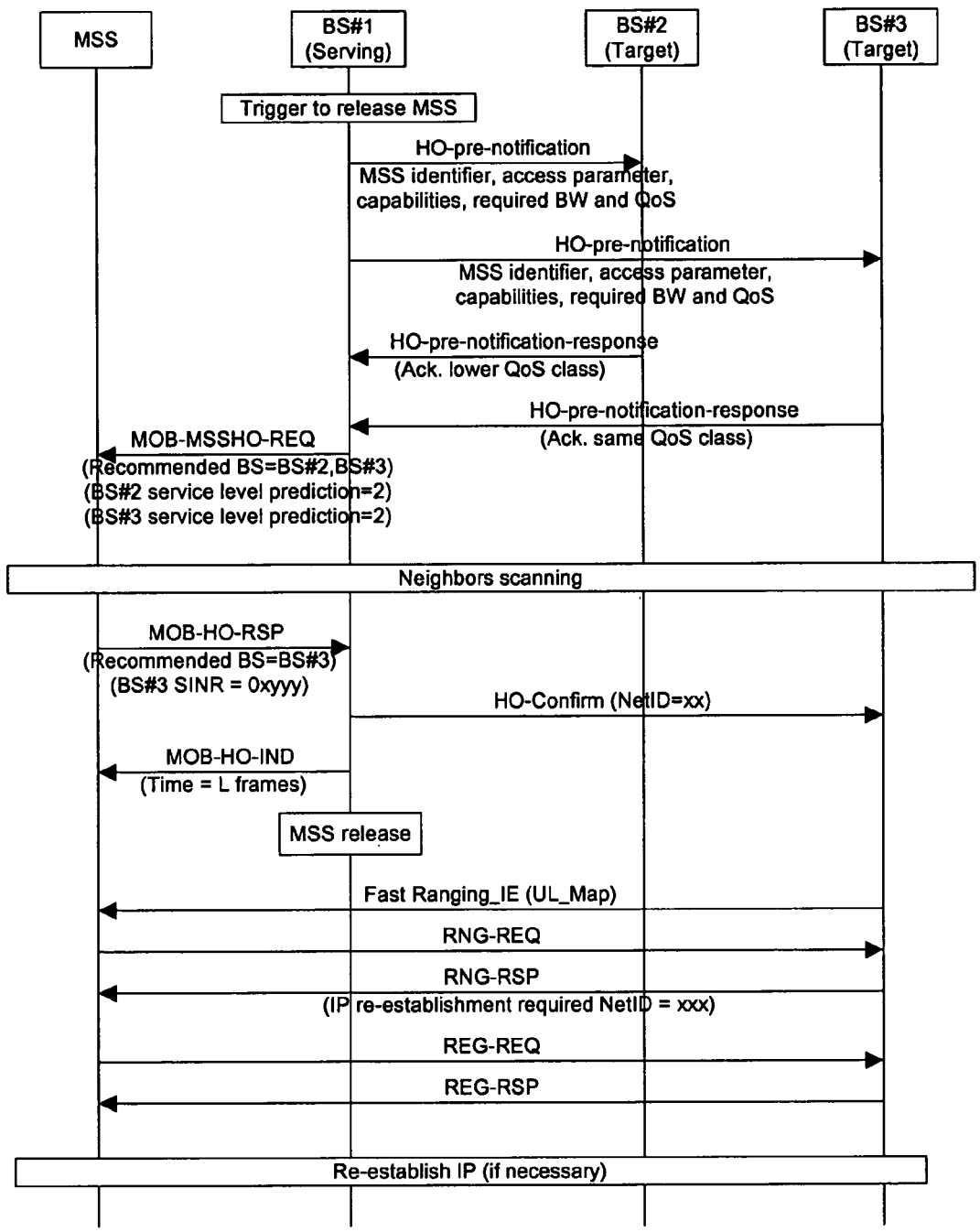
FIG. 8 depicts an example of informing the mobile station through a ranging procedure during handover as to whether its IP address should be re-configured (re-established).

FIG. 8 shows an example of the operation in informing the terminal about whether the IP address should be re-configured (re-established) through the ranging procedures during handover.

Figure 9:
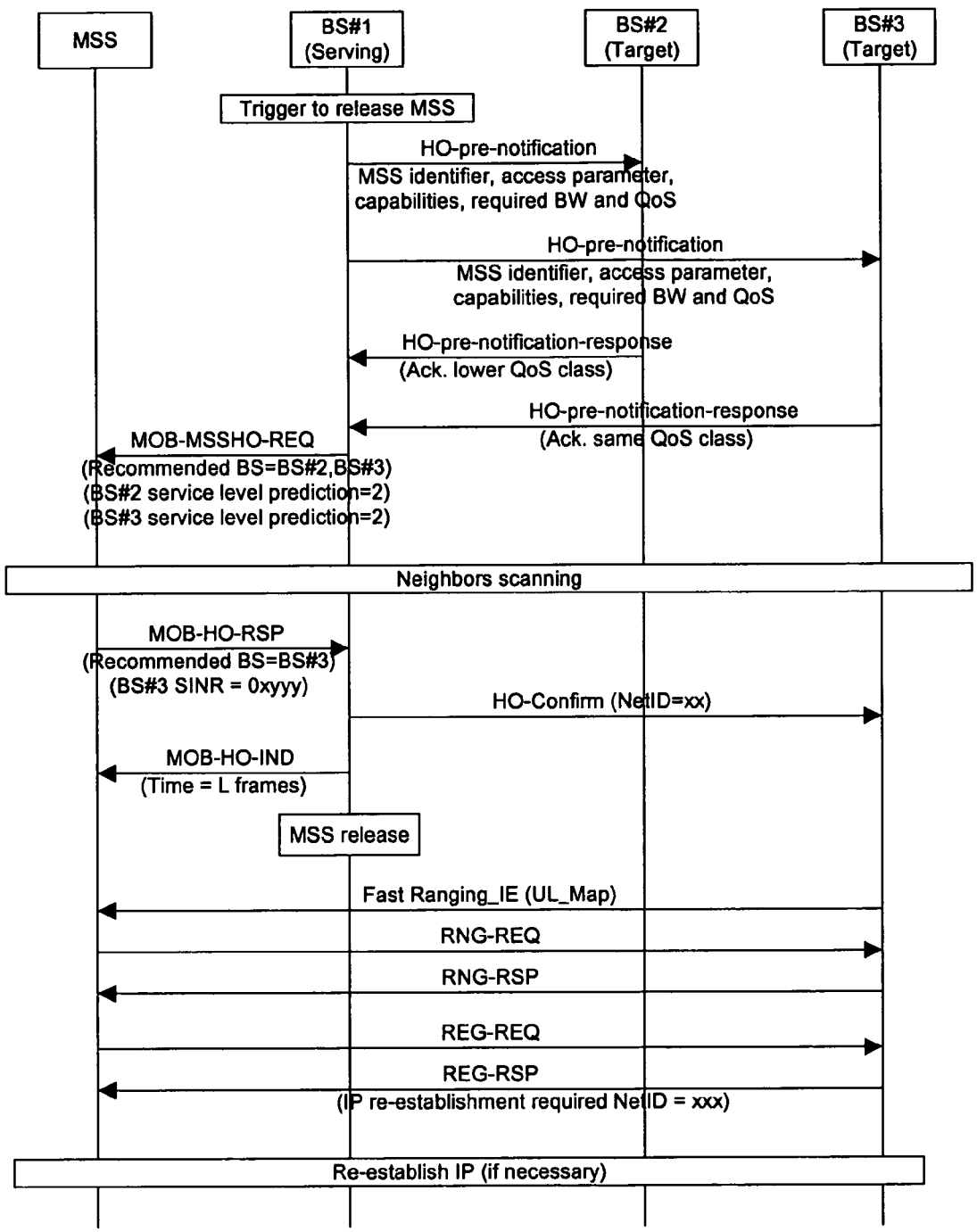
FIG. 9 depicts an example of informing the mobile station through a registration procedure during handover as to whether its IP address should be re-configured (re-established).

FIG. 9 shows an example of the operation in informing the terminal about whether the IP address should be re-configured (re-established) through the registration procedures during handover.

It can be said that the present invention relates to the minimization of IP connectivity establishment procedures. IEEE 802.16 uses DHCP (Dynamic Host Configuration Protocol) and Mobile IP in order to allocate IP addresses to MSSs (Mobile Subscriber Stations), and after the MSS handover to the target BS (base station), re-establishment of IP connectivity is required. However, in case the same subnet is used in the target BS or the same Foreign Agent is connected in the new BS, the re-establishment of IP connectivity procedure can be skipped and the MSS can use the same IP address.

Therefore, a mechanism to determine the subnet change or Foreign Agent change for a moving MSS is required. When the MSS moves to a new BS, to decide the MSS's subnet change or Foreign Agent change, the new BS can provide the MSS with an instruction of subnet change provided through a backbone message. Here, the network ID can represent a Subnet Prefix, an Access Router, or a Foreign Agent. One BS can have more than one NetID depending upon the network configuration.

The current IEEE 802.16 does not provide the MSS with an instruction for IP re-establishment. However, the present inventors propose a possible solution for the MSS to make a decision as to whether it needs to re-establish IP connectivity. By giving the MSS's IP related information to the target BS over a backbone, the target BS can provide a moving MSS with an instruction of IP-establishment.

In the related art, after MSS handover, a new IP allocation procedure is required regardless of subnet change. However, if the network subnet is not changed in the new BS, the MSS can use the old IP address which was used in the previous BS. Namely, in the DHCP case, if the network subnet is not changed in the new BS, the MSS can use the old IP address which was used in the previous BS. In the Mobile IPv4 case, when a MSS moves to a new BS, it takes some time for the MSS to re-establish IP connectivity using Mobile IPv4. However, if the same Foreign Agent is connected to the new BS, the MSS can skip the mobile IP procedure to reduce delay.

To do so, the MSS needs information to decide whether the subnet or Foreign Agent is different from the previous BS. The information for subnet change decision is different depending upon the method for allocation the IP address. Two IP address allocating methods can be defined. One is using DHCP, and the other is using Mobile IPv4. Since DHCP messages and Mobile IPv4 messages are flowing on the secondary management connection, the BSs can monitor and store the IP related information. When an MSS is moving to a new BS, the old BS sends stored information (e.g., send MSS's NetID through a backbone) to the new BS, which then compares the received information with its own stored information (e.g., NetID) to make a decision of subnet change. The new BS provides a decision of subnet change in REG-RSP to the MSS after MSS's successful handover. For example, if one of the NetIDs in the new BS is the same as the received NetID from the previous BS, the new BS instructs the MSS with IP re-establishment is not required in a "Method for allocating IP address TLV of REG-RSP. If the NetID either in the Serving BS or the Target BS or both do not exist, the target BS should instruct to the MSS to re-establish IP connectivity.

The procedures of how a subnet change can be decided for the DHCP case and for the Mobile IP case will be described hereafter.

Figure 10A:
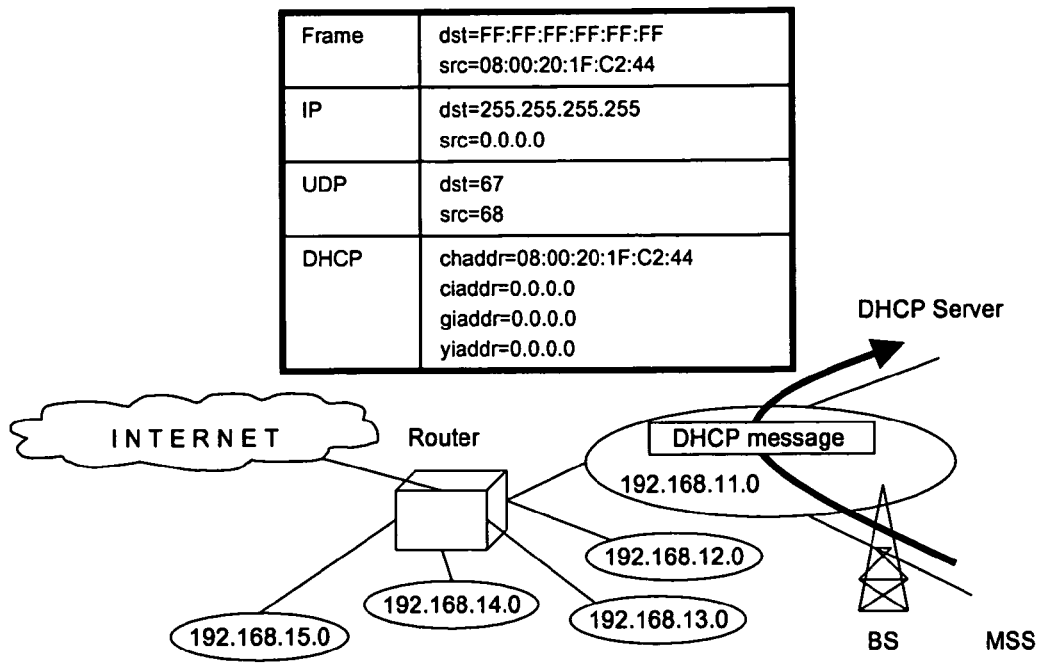
FIGS. 10A and 10B depicts an example of how a subnet change can be decided for the DHCP case, wherein the DHCP server exists on the same network with the MSS.
Figure 10B:
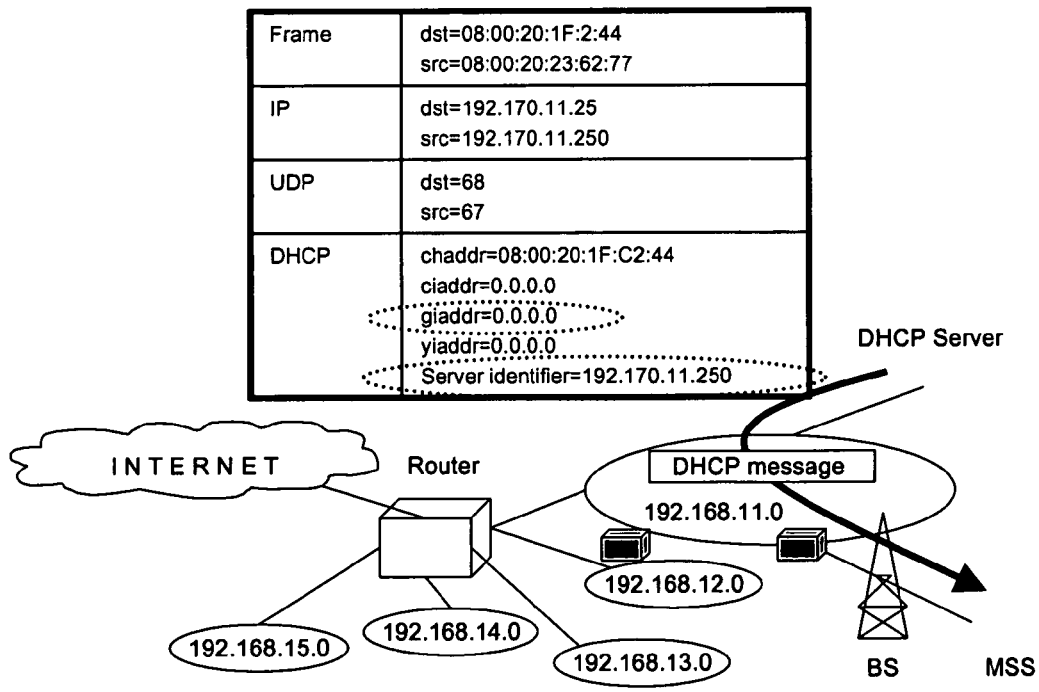
Figure 11A:
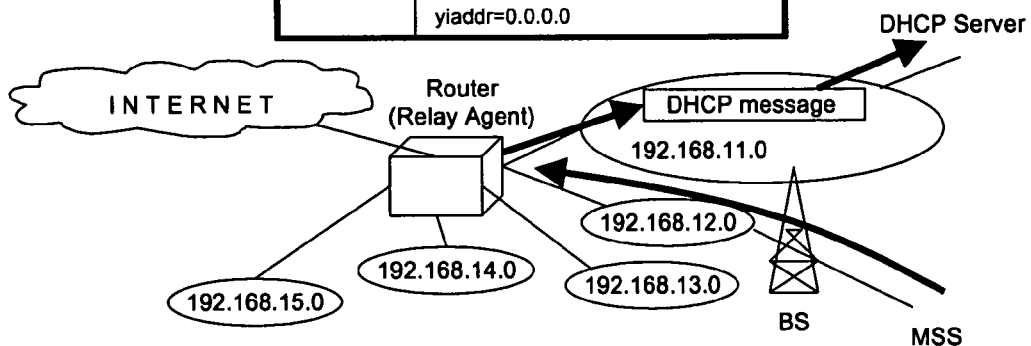
FIGS. 11A and 11B depicts an example of how a subnet change can be decided for the DHCP case, wherein the DHCP server exists on a different network with the MSS.
Figure 11B:
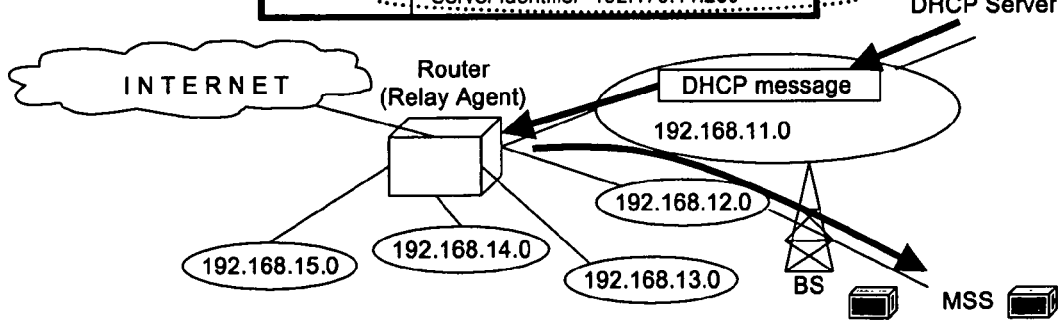

FIGS. 10A, 10B, 11A and 11B show examples of the DHCP case, whereby, FIGS. 10A and 10B show when the DHCP server exists on the same network with the MSS, while FIGS. 11A and 11B shown when the DCHP server exists on a different network with the MSS. FIG. 10A shows a DHCP message broadcast by the MSS, and FIG. 10B shows a DHCP message sent by the DHCP server in response to the message from the MSS. FIG. 11A shows a DHCP message forwarded from a MSS to a DHCP server by a relay agent in the router, while FIG. 11B shows a response from the DHCP server forwarded by the relay agent in the router to the MSS.

Referring to FIGS. 10A through 11B, the relay agent IP address and server identifier in the DHCP response from the server can be used to decide whether a subnet is changed. Here, 'giaddr' refers to a relay agent IP address, and 'server identifier' is used to identify a DHCP server in a DHCP message and as a destination address from clients to servers.

Figure 12:
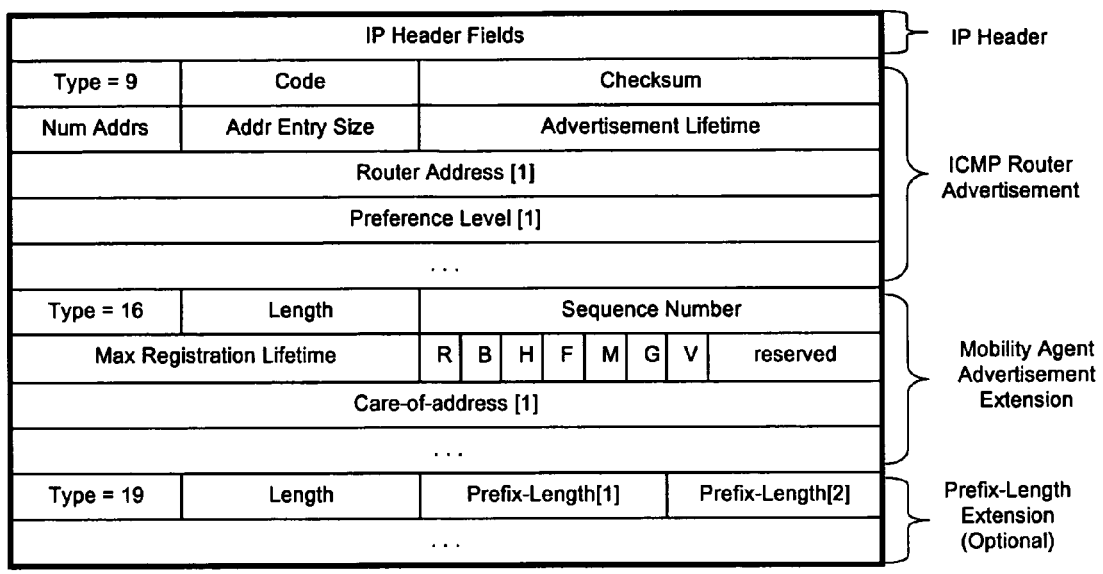
FIG. 12 shows an example of an agent advertisement message according to the present invention.

In the Mobile IPv4 case, the MSSs determine their movement by either using a lifetime field within the ICMP Router Advertisement [IETF RFC 1256] portion of an Agent Advertisement [IETF RFC 3220] or by using Network-Prefixes [IETF RFC 3220]. The Router Address with prefix-length extension can identify a network-prefix. However, the prefix-length is an optional parameter, and when the prefix-length is not present, this information should not be used to decide the network-prefixes. FIG. 12 shows an example of an agent advertisement message.

In the DHCP case, the BS listens to the DHCP offer message from the DHCP server to the MSSs on the secondary management connection and stored the 'giaddr' and 'server identifier'. In the Mobile IP case, the BS listens to the periodic Agent Advertisement from the Foreign Agent and stores the Router Address in an ICMP Router Advertisement portion and a prefix-length extension in the Prefix-Length Extension of an Agent Advertisement.

By providing information to a target BS when MSS moves to a new BS, the target BS can determine whether the MSS's subnet has changed or not. The target BS tells the MSS whether it has to re-establish IP connectivity or not in the registration response (RSG-RSP) message.

Accordingly, the present invention adds a mechanism for the BS to monitor the DHCP related and Mobile IP related information. Also, Type-Length-Value (TLV) parameters are added into the REG-RSP message, which is used to instruct the MSS whether it should perform an IP address re-establishment procedure.

For mobile networks, the target BS may include the IP Address Change Information TLV in the REG-RSP message for MSS handover. The TLV specifies whether MSS has to re-establish IP connectivity or not based on the received information from the old BS over a backbone. If the target BS cannot make a decision, the value should be set to 1.

For a managed MSS, there is the possibility that entry at the new BS necessitates Layer 3 protocol exchanges in order to retain IP connectivity. Such an MSS should take appropriate steps to detect and respond to the change of BS (e.g., by performing Mobile IPv4 movement detection and re-registration, or Mobile IPv4 Binding Update). In order for the MSS to facilitate an IP connectivity retainment, the new BS may provide the MSS with an instruction of IP address change. The new BS's IP address change instruction is made based on the information from the old BS over a backbone. This information is stored by monitoring the MSS's IP connectivity establishment using DHCP and listening to an Agent Advertisement from the Foreign Agent on the secondary management connection.

The following Table 1 shows an example of IP address establishment information.

TABLE 1

| Name | Type | Length | Value | Scope |
| --- | --- | --- | --- | --- |
| IP Address Establishment Information | ?? | variable | Compound | REG-RSP |

The following Table 2 shows an example of TLV values that may appear in the IP address establishment information TLV.

TABLE 2

| Name | Type | Length | Value | Scope |
| --- | --- | --- | --- | --- |
| DHCP IP address establishment information | ??.? | 8 | Relay agent's IP address in giaddr and the DHCP server IP address in the server identifier option in DHCP message | REG-RSP |

The following Table 3 shows an example of TLV values that may appear in the IP address establishment information TLV.

TABLE 3

| Name | Type | Length | Value | Scope |
| --- | --- | --- | --- | --- |
| Mobile IP FA address information | ??.? | variable | Router Addresses in ICMP Router Advertisement portion and prefix-length extension in Prefix-Length Extension of an Agent Advertisement | REG-RSP |

The following Table 4 shows an example of an IP Address Change Information. This field indicates whether or not the MSS needs to re-establish an IP address after handover. A bit value of 'O' indicates that such is not required, while '1' indicates it is required.

TABLE 4

| Name | Type | Length | Value | Scope |
| --- | --- | --- | --- | --- |
| IP Address Change | ?? | 1 | Bit #0: IP re-establishment required | REG-RSP |

The following Table 5 shows an example of the format of a Handover Confirm Message.

TABLE 5

| Field | Size | Notes |
| --- | --- | --- |
| Global Header | 152 bits | |
| For (j=0; j<Num Records; j++) { | | |
| MSS unique identifier | 48 bits | A unique identifier used by MSS (as provided to the BS on the RNG-REQ message) |
| BW Estimated | 8 bits | Bandwidth which is provided by BS (to guarantee minimum packet data transmission) TBD how to set this field |
| QoS Estimated | 8 bits | Quality of Service level Unsolicited Grant Service (UGS) Real-time Polling Service (rtPS) Non-real-time Polling Service (nrtPS) Best Effort Service (BE) |
| } | | |
| Relay Agent IP address | 32 bits | Relay Agent's IP address in giaddr in DHCP message |

TABLE 5-continued

| Field | Size | Notes |
|---|---|---|
| DHCP server IP address | 32 bits | DHCP server IP address in the server identifier option in DHCP message from the server |
| For (k=0; k<Num Router Addr; k++) { | | |
| Router Address | 32 bits | Router Addresses in ICMP Router Advertisement portion |
| Prefix-Length | 8 bits | Prefix-length extension in Prefix-Length-Extension of an Agent Advertisement |
| } | | |
| Security field | TBD | A means to authenticate this message |

Also, the present invention proposes to modify the "method for allocating IP address TLV" in the REG-RSP messages, which are used to instruct the MSS as to whether it should perform IP address re-establishment procedures, which is achieved by adding "NetID" and "HO-Confirm and Paging-announce" backbone messages.

Regarding the "Method for allocating IP address," for establishing IP connectivity, the BS may include the method for allocating IP address TLV in the REG-RSP for the SS's or MSS's IP connectivity establishment. The TLV also specifies whether the MSS has to re-establish IP connectivity or not when the MSS moves to the new BS. The IP re-establishment required bit is set based on the comparison with the received NetID from the old BS over a backbone. If the target BS cannot make a decision, the value should be set as '1' (IP re-establishment required).

The following Tables 6 and 7 show examples of the Method for allocating IP address, Table 8 shows an example of a HO-Confirm Message format, and Table 9 shows an example of a Paging-announce message.

TABLE 6

| Type | Length | Value | Scope |
|---|---|---|---|
| 5.23 | 1 | Bit #0: DHCP - default<br>Bit #1: Mobile IPv4<br>Bit #2: IP re-establishment required<br>Bit #3–7: reserved; shall be set to zero | REG-REQ<br>REG-RSP |

TABLE 7

| Type | Length | Value |
|---|---|---|
| 17 | 1 | Bit #0: DHCP<br>Bit #1: Mobile IPv4<br>Bit #2: IP re-establishment required<br>Bit #3–7: reserved; shall be set to zero |

TABLE 8

| Field | Size | Notes |
|---|---|---|
| Global Header | 152 bits | |
| For (j=0; j<Num Records; j++) { | | |
| MSS unique identifier | 48 bits | A unique identifier used by MSS (as provided to the BS on the RNG-REQ message) |

TABLE 8-continued

| Field | Size | Notes |
|---|---|---|
| BW Estimated | 8 bits | Bandwidth which is provided by BS (to guarantee minimum packet data transmission) TBD how to set this field |
| QoS Estimated | 8 bits | Quality of Service level Unsolicited Grant Service (UGS) Real-time Polling Service (rtPS) Non-real-time Polling Service (nrtPS) Best Effort Service (BE) |
| } | | |
| NetID | 8 bits | Network ID of MSS |
| Security field | TBD | A means to authenticate this message |

TABLE 9

| Field | Size | Notes |
|---|---|---|
| Message Type=? | 8 bits | |
| Sender BS-ID | 48 bits | A BS unique identifier used by MSS (same number as that broadcast on the DL-MAP message) |
| Target BS-ID | 48 bits | Set to 0xffffff to indicate broadcast |
| Time Stamp | 32 bits | Number of milliseconds since midnight GMT (set to 0xffffff to ignore) |
| Num MSS | 8 bits | Number of MSSs to page |
| For (j=0; j<Num Records; j++) { | | |
| MSS MAC address | 48 bits | 48-bit unique identifier used by MSS (as provided to the BS on the RNG-REQ message) |
| NetID | 8 bits | Network ID of MSS |
| PAGING CYCLE | 16 bits | Bandwidth which is provided by BS (to guarantee minimum packet data transmission) TBD how to set this field |
| PAGING OFFSET | 8 bits | Quality of Service level Unsolicited Grant Service (UGS) Real-time Polling Service (rtPS) Non-real-time Polling Service (nrtPS) Best Effort Service (BE) |
| } | | |
| Security field | TBD | A means to authenticate this message |
| CRC field | 32 bits | |

Regarding the effects of the present invention, when a mobile terminal in idle mode performs network entry procedures, the bases station (point of attachment) that performed the registration release procedures of the mobile terminal delivers the network prefix related information (e.g., NetID, Router Advertisement, Agent Advertisement) of the mobile terminal to another base station (point of attachment) within the same paging zone, and the base station performing the network entry compares the above network prefix related information (e.g., NetID) with the network prefix related information (e.g., NetID) that it is using, to inform whether IP address re-configuration (re-establishment) of the mobile station would be needed. Thus, by using the present invention, when the network prefix related information (e.g., NetID) of a terminal is changed, this changed network prefix related information (e.g., NetID) is informed to the terminal to allow it to be used when performing handover with a different network other that a IEEE 802.16 network.

Also, in the present invention, when the mobile terminal performs IP address configuration (establishment) procedures after handover, if the subnet used among two base stations are the same or if the same foreign agent is used, the previous base station delivers the network prefix related information (e.g., NetID, router advertisement, Agent Advertisement) to the new base station, the new base station compares the delivered network prefix related information (e.g., NetID) with the network prefix related information (e.g., NetID) that it can or is currently using, and informs the mobile station as to whether IP address re-configuration is needed or not.

Accordingly, the present invention has the effect of simplifying the IP address configuration (establishment) procedures when the terminal changes from idle mode to receiving mode or when handover is performed, and can thus minimize the time delay caused by IP address re-configuration (re-establishment) of the related art.

As the present invention has been described above with respect to wireless access technologies, it can be clearly understood that various types of wireless access technologies currently under development (such as WiMax, WiBro, Wi-Fi, etc.) can also benefit from the features and teachings of the present invention, which are applicable because of the similarities involved in wireless communications involving user terminal mobility, handovers and idle mode operations.

The foregoing description of the preferred embodiments is provided to enable any person skilled in the art to make or use the present invention. Various modifications to these embodiments will be readily apparent to those skilled in the art, and the generic principles defined herein may be applied to other embodiments. Thus, the present invention is not intended to be limited to the embodiments shown herein but us to be accorded the widest scope consistent with the principles and novel features disclosed herein.

What is claimed is:

1. A method of configuring an Internet Protocol (IP) address of a terminal in a broadband wireless access system, the method comprising:
   receiving a network prefix ID through a paging broadcast backbone message from a previous base station from which a registration of the mobile station is released;
   receiving a registration request message from the terminal;
   comparing a currently usable network prefix ID with the network prefix ID received from the previous base station;
   determining whether an IP address of the terminal should be re-configured; and
   transmitting a registration response message informing the terminal about whether the IP address of the terminal should be re-configured according to the determination,
   wherein a result of the determination of whether the IP address should be re-configured is informed by activation of an IP re-establishment required bit or a network prefix ID change indicator of the registration response message both when the IP address should be re-configured and when the EP address should be not re-configured,
   wherein the registration response message comprises IP address allocation information and network ID information, the IP address allocation information including values indicating Dynamic Host Configuration Protocol (DHCP)-default, mobile IPv4, and IP re-establishment required,
   wherein the value indicating DHCP-default corresponds to bit #0 of the IP address allocation information, the value indicating mobile IPv4 corresponds to bit #1 of the IP address allocation information, and the value indicating IP re-establishment required corresponds to bit #2 of the IP address allocation information,
   wherein bits #3 to #7 of the IP address allocation information are set to zero, and
   wherein the paging broadcast backbone message is a message used to share information about mobile terminals among base stations within a same paging zone.

2. A method of establishing Internet Protocol (IP) connectivity for a user device, the method performed by the user device and comprising:
   performing a deregistration procedure with a network in order to enter an idle mode;
   ending the idle mode and performing network entry procedures with the network upon detection of a need for sending uplink traffic or for receiving downlink traffic;
   receiving instructions from the network that specify whether an IP address of the user device should be re-configured, the instructions indicated by activation of an IP re-establishment required bit or a network prefix ID change indicator of a registration response message both when the IP address should be re-configured and when the IP address should be not re-configured; and
   establishing IP connectivity with the network using the IP address that is re-configured according to the received instructions,
   wherein the instructions are included in the registration response message received from the network during the network entry procedures,
   wherein the network compares a currently usable network prefix ID with a network prefix ID established prior to the deregistration procedure, determines whether the IP address should be re-configured, and sends the instructions based on the determination,
   wherein the registration response message comprises IP address allocation information and network ID information, the IP address allocation information including values indicating Dynamic Host Configuration Protocol (DHCP)-default, mobile IPv4, and IP re-establishment required,
   wherein the value indicating DHCP-default corresponds to bit #0 of the IP address allocation information, the value indicating mobile IPv4 corresponds to bit #1 of the IP address allocation information, and the value indicating IP re-establishment required corresponds to bit #2 of the IP address allocation information, and
   wherein bits #3 to #7 of the IP address allocation information are set to zero.

3. A method of establishing internet Protocol (IP) connectivity for a user device, the method performed by the user device and comprising:
   receiving a handover request from a serving base station of a network, the serving base station having performed handover pre-notification procedures with a target base station;
   performing a neighbor scanning procedure with the network;
   sending a handover response to the serving base station;
   receiving a handover indication from the serving base station that performed handover confirmation with the target base station;

performing a ranging procedure and a registration procedure with the target base station;

receiving instructions from the target base station that specify whether an IP address of the user device should be re-configured, the instructions indicated by activation of an IP re-establishment required bit or a network prefix ID change indicator of a registration response message both when the IP address should be re-used and when the IP address should be re-configured; and establishing IP connectivity with the network using the IP address that is re-configured according to the received instructions, wherein the target base station receives a network prefix ID from the serving base station through a paging broadcast backbone message, compares a currently usable network prefix ID with the network prefix ID received from the previous base station, determines whether the IP address should be re-configured, and sends the instructions based on the determination, wherein the registration response message comprises IP address allocation information and network ID information, the IP address allocation information including values indicating Dynamic Host Configuration Protocol (DHCP)-default, mobile IPv4, and IP re-establishment required, wherein the value indicating DHCP-default corresponds to bit #0 of the IP address allocation information, the value indicating mobile IPv4 corresponds to bit #1 of the IP address allocation information, and the value indicating IP re-establishment required corresponds to bit #2 of the IP address allocation information, wherein bits #3 to #7 of the IP address allocation information are set to zero, and wherein the paging broadcast backbone message is a message used to share information about mobile terminals among base stations within a same paging zone.

* * * * *